United States Patent Office 3,787,462
Patented Jan. 22, 1974

3,787,462
PROCESS FOR THE PRODUCTION OF PALLADIUM ACETYL ACETONATE OF LOW CHLORINE CONTENT
Wolfgang Swodenk, Odenthal-Globusch, Gerhard Scharfe, Leverkusen, and Wolfram Dornfeldt, Leichlingen, Germany, assignors to Bayer Aktiengesellschaft, Leverkusen, Germany
No Drawing. Filed Feb. 11, 1972, Ser. No. 225,677
Int. Cl. C07f 15/00
U.S. Cl. 260—429 J   4 Claims

ABSTRACT OF THE DISCLOSURE

A high purity palladium acetyl acetonate is obtained at low reaction times by precipitating a palladium compound from an aqueous alkali palladium chloride solution with an alkali metal hydroxide, converting the precipitate to the palladium acetyl acetonate with acetyl acetone, and washing and drying the acetonate.

---

This invention relates to the production of palladium acetyl acetonate, more specifically to the production of palladium acetyl acetonate of extremely high purity by a process requiring only low reaction times.

It is known to make palladium acetyl acetonate from palladium chloride (see A. A. Grinberg et al., Journal of Applied Chemistry, U.S.S.R. 26, 801 (1953)). In this process palladium chloride is reacted with an aqueous solution of sodium hydroxide and acetyl acetonate, and subsequently the reaction mixture is heated to about 50° C. with stirring. In this process there is obtained a precipitate which contains, after washing out with water and drying, 11.5 parts by weight of benzene insolubles (probably unreacted palladium chloride) per hundred parts by weight of palladium chloride charged to the reaction. From the benzene solution there can be obtained, after separating the benzene insoluble materials, palladium acetyl acetonate by the evaporation of the benzene and drying.

It is also known, from Fernelius, Inorganic Synthesis, vol. V (1957) at pages 105 and 108, that palladium acetyl acetonate can be obtained by reacting 1,3-diketones with a suspension of palladium hydroxide. In this synthesis, palladium hydroxide is required as a raw material, which is disadvantageous because palladium hydroxide is not a staple commodity and must be obtained, in a separate reaction step, from palladium or sodium palladium chloride. In the preparation of palladium acetyl acetonate according to Fernelius, a precipitate is obtained which, after washing with water and drying, consists only partially of palladium acetyl acetonate. From this precipitate there can be obtained palladium acetyl acetonate by the solution of the precipitate in benzene, separation of the palladium hydroxide and evaporation of the benzene from the benzene solution.

It has now been found that palladium acetyl acetonate with an exceptionally low organically bound chlorine content of, e.g., 0.05% by weight or 0.01% by weight, can be obtained in a process which requires less time than the prior art synthesis.

Essentially, the process of this invention comprises adding an alkali metal hydroxide solution to an aqueous alkali palladium chloride solution in at least a sufficient quantity to convert the water-soluble palladium compound into a water-insoluble palladium compound precipitate, and then adding acetyl acetone in a sufficient quantity for the stoichiometric conversion of the water-insoluble palladium compound to palladium acetyl acetonate, and agitating the resulting mixture until a water-insoluble deposit has formed. After washing with water and drying, the product is 99 percent soluble in benzene. The reaction is carried out at temperatures of from 5° to 50° C., preferably 10° to 40° C. The conversion of the water-insoluble palladium compound precipitate with acetyl acetonate to palladium acetyl acetonate can be effected at room temperature and in a reaction time of two hours or less.

In a preferred embodiment, an aqueous sodium hydroxide solution is added to an aqueous sodium palladium chloride solution, to which acetyl acetone is added following the formation of a water-insoluble deposit. The mixture is stirred for two hours at a temperature of from 10 to 40° C., after which the deposit is washed and then dried.

The palladium acetyl acetonate obtained in accordance with the invention has an organically bound chlorine content of less than 0.05% by weight.

The high purity palladium acetyl acetonates of this invention are generally useful for the preparation of noble metal catalysts which are free from halogen compounds, and for the preparation of noble metal compounds in general which are free from halogen compounds. They are especially useful for and have particular advantage when applied in the preparation of olefinic esters as described in U.S. patent specification 3,221,045, in particular Example 9.

EXAMPLES

Example 1

50 g. of an aqueous sodium palladium chloride solution with a palladium content of 15 percent by weight are introduced with 200 ml. of water into a flask equipped with a stirring mechanism. 130 ml. of 1 N NaOH are then added with stirring over a period of 1 hour at room temperature. A water-insoluble deposit is formed. 30 g. of acetyl acetone are added, followed by stirring for two hours at room temperature. A yellow deposit of readily filterable palladium acetyl acetonate is formed. The deposit is filtered, washed with water until it is free from chlorine and dried. The product thus obtained is over 99 percent soluble in benzene and has a chlorine content of only 0.01 percent by weight.

Example 2

The procedure was as in Example 1, except that potassium hydroxide was used instead of the sodium hydroxide. The results obtained were similar to those of Example 1.

It will be understood that the specification and examples are illustrative but not limitative of the present invention and that other embodiments within the spirit and scope of the invention will suggest themselves to those skilled in the art.

What is claimed is:
1. Process for the production of palladium acetyl acetonate with an organically bound chlorine content of less than 0.05 percent by weight and a benzene-soluble content of at least 99 percent, which process comprises adding an aqueous alkali hydroxide solution to an aqueous alkali palladium chloride solution in a quantity sufficient to convert the water-soluble palladium compound into a water-insoluble palladium compound, thereafter adding acetyl acetone thereto in at least a quantity sufficient for the stoichiometric conversion of the water-insoluble palladium compound to palladium acetyl acetonate, agitating the resulting mixture to produce a water-insoluble deposit, recovering said deposit and washing said deposit with water and drying the same to yield the said palladium acetyl acetonate.
2. Process as claimed in claim 1 wherein said alkali palladium chloride is sodium palladium chloride and said alkali metal hydroxide is sodium hydroxide.

3. The process as claimed in claim 1 wherein the reaction is carried out at a temperature in the range of from 10° to 40° C.

4. Process as claimed in claim 1 wherein the conversion of the water insoluble palladium compound to palladium acetyl acetonate is effected at room temperature in a reaction time not exceeding about two hours.

References Cited

UNITED STATES PATENTS 3,474,464  10/1969  Matthews et al. ____ 260—429 R

FOREIGN PATENTS 289,493  4/1928  Great Britain.

OTHER REFERENCES

Fernelius et al.: Inorganic Synthesis, vol. 5 (1957), pp. 105–108.

Grinberg et al.: Chem. Abstracts 47 (1953), column 11060.

Barbieri: Chem. Abstracts 8 (1914), pp. 2988–9.

Furman: Standard Methods of Chemical Analysis, D. Van Nostrand Co., Inc., Princeton, N.J., 6th ed. (1962), vol. 1, p. 881.

DANIEL E. WYMAN, Primary Examiner

A. P. DEMERS, Assistant Examiner

U.S. Cl. X.R.

252—431 R

PO-1050
(5/69)

UNITED STATES PATENT OFFICE
CERTIFICATE OF CORRECTION

Patent No. __3,787,462__  Dated __January 22, 1974__

Inventor(s) __Wolfgang Swodenk, Gerhard Scharfe & Wolfram Dornfeldt__

It is certified that error appears in the above-identified patent and that said Letters Patent are hereby corrected as shown below:

Column 1 Heading, after U.S. Serial No. 225,677 insert:

"CIP of Serial No. 5,909 filed January 26, 1970 claiming priority of German P 19 04 235.4 filed January 29, 1969."

Signed and sealed this 8th day of October 1974.

(SEAL)
Attest:

McCOY M. GIBSON JR.
Attesting Officer

C. MARSHALL DANN
Commissioner of Patents